United States Patent [19]

Sugiyama et al.

[11] Patent Number: 5,502,132

[45] Date of Patent: Mar. 26, 1996

[54] PROCESS FOR PRODUCING A PERFLUORO COPOLYMER

[75] Inventors: Norihide Sugiyama; Hidenobu Murohushi; Masaru Nakamura, all of Yokohama, Japan

[73] Assignee: Asahi Glass Company Ltd., Tokyo, Japan

[21] Appl. No.: 194,124

[22] Filed: Feb. 9, 1994

Related U.S. Application Data

[62] Division of Ser. No. 919,646, Jul. 27, 1992, abandoned.

[51] Int. Cl.$^6$ .................................................. C08F 16/24
[52] U.S. Cl. .................................................. 526/247
[58] Field of Search ....................................... 526/247

[56] References Cited

U.S. PATENT DOCUMENTS

| | | | |
|---|---|---|---|
| 4,897,457 | 1/1990 | Nakamura et al. | 526/247 |
| 4,910,276 | 3/1990 | Nakamura et al. | 526/247 |
| 5,117,272 | 5/1992 | Nomura et al. | |
| 5,276,121 | 1/1994 | Resnick. | |

FOREIGN PATENT DOCUMENTS

| | | | |
|---|---|---|---|
| 63-238115 | 10/1988 | Japan | 526/247 |
| 63-238111 | 10/1988 | Japan | 526/247 |
| 1147501 | 6/1989 | Japan | 526/247 |
| 219165 | 1/1990 | Japan | 526/247 |
| 39963 | 2/1991 | Japan . | |
| 168642 | 7/1991 | Japan . | |
| 12355 | 1/1992 | Japan . | |
| 1106343 | 3/1968 | United Kingdom | 526/247 |
| 1106344 | 3/1968 | United Kingdom | 526/247 |

*Primary Examiner*—Joseph L. Schofer
*Assistant Examiner*—N. Sarofin
*Attorney, Agent, or Firm*—Oblon, Spivak, McClelland, Maier, & Neustadt

[57] ABSTRACT

A process for producing a perfluoro copolymer, which comprises subjecting a perfluoro monomer having a carbon-carbon double bond with a different polymerization ability at each terminal of the molecule and perfluoro-2,2-dimethyl-1,3-dioxol to radical copolymerization.

5 Claims, No Drawings

PROCESS FOR PRODUCING A PERFLUORO COPOLYMER

This application is a division of application Ser. No. 07/919,646, filed on Jul. 27, 1992, now abandoned.

BACKGROUND OF THE INVENTION

1. Field of the Invention

The present invention relates to a process for producing a perfluoro copolymer having a cyclic structure in its main chain.

2. Discussion of Background

With respect to a fluorine-containing polymer having a cyclic structure in its main chain, particularly a perfluoro cyclic polymer, Japanese Unexamined Patent Publication No. 13125/1989 discloses that $CF_2=CFO(CF_2)_nCF=CF_2$ undergoes cyclopolymerization by itself to give a non-crystalline solvent-soluble polymer having a cyclic structure of the formula:

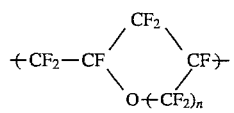

wherein n is 1 or 2, and/or the formula:

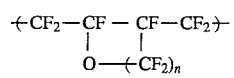

wherein n is 1 or 2. Usually, the softening point of a non-crystalline polymer is governed by the glass transition temperature (Tg). Therefore, many physical properties such as mechanical properties and electrical properties undergo substantial changes around this glass transition temperature. The cyclic polymer obtained by the homopolymerization of $CF_2=CFO(CF_2)_nCF=CF_2$ is no exception, and when n=1, Tg of the polymer=69° C., and even when n=2, Tg=108° C. Thus, the thermal deformation temperature is not so high that there has been a problem that the polymer is not suitable for use at a high temperature.

On the other hand, with respect to a perfluoro cyclic polymer, U.S. Pat. No. 4,754,009 discloses that an amorphous polymer can be obtained by the copolymerization of perfluoro-2,2-dimethyl-1,3-dioxol (hereinafter referred to simply as PDD) of the formula:

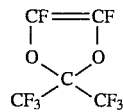

and tetrafluoroethylene, and this copolymer is soluble in a solvent and excellent in the light transmittance and has a very high Tg e.g. at a level of 250° C. when the content of PDD is 89 mol %.

However, such a copolymer has a problem that with an increase of the tetrafluoroethylene content, Tg substantially decreases, and the crystallinity appears, whereby the transparency deteriorates, and the solvent-solubility tends to be impaired. Besides, this copolymer is obtained by a reaction of a gaseous monomer and a liquid monomer and thus has problems such that it is difficult to control the composition, it is difficult to obtain a copolymer having a desired Tg, and a homopolymer of tetrafluoroethylene is likely to be formed as a byproduct.

SUMMARY OF THE INVENTION

It is an object of the present invention to solve the above problems inherent to a perfluoro polymer and to provide a perfluoro polymer having a proper glass transition temperature durable for use at a high temperature while maintaining the solvent solubility and transparency. The present inventors have conducted extensive studies on a perfluoro monomer having a cyclic structure which can be copolymerized with a cyclic polymerizable perfluoro monomer on the basis of the recognition of the above problems, and as a result, have found that a certain specific combination of monomers can be polymerized by radical copolymerization at an optional ratio without losing the cyclopolymerization ability. Further, they have found that the copolymer has no crystallizability over the entire compositional range, and it is possible to obtain a perfluoro polymer having a wide range of glass transition temperature ranging from 70° to 300° C. while maintaining the solvent solubility and transparency. Further, it has been surprisingly found that the copolymer of the present invention is not only transparent but has a very low refractive index, and the refractive index can optionally be controlled by adjusting the composition for copolymerization.

Thus, the present invention has been accomplished on the basis of the above discoveries and provides a novel process for producing a perfluoro copolymer, which comprises subjecting a perfluoro monomer having a carbon-carbon double bond with a different polymerization ability at each terminal of the molecule and perfluoro- 2,2-dimethyl-1,3-dioxol to radical copolymerization.

DETAILED DESCRIPTION OF THE PREFERRED EMBODIMENTS

In the present invention, radical polymerization is employed as a method for polymerization. Namely, as the polymerization method, there is no particular restriction so long as it is a method which proceeds by a radical reaction. For example, polymerization by an organic or inorganic radical initiator, or a photo-, ionization- or heat-polymerization may be mentioned. Chain transfer agent can be also used in order to control molecular weight. As the manner for the polymerization, bulk polymerization, solution polymerization, suspension polymerization or emulsion polymerization may be employed.

In the present invention, the perfluoro monomer having a carbon-carbon double bond with a different polymerization ability at each terminal of the molecule may be a compound having all hydrogen bonded to carbon substituted by fluorine and having at each terminal of the molecule a group having different polymerization ability among carbon-carbon double bonds such as a vinyl ether group, an allyl group, an allyl ether group, an isopropenyl group, an isopropenyl ether group, a butenyl group, a butenyl ether group, an acryloyl group, and a methacryloyl group. Such a perfluoro monomer undergoes cyclopolymerization during the radical polymerization, since it has carbon-carbon double bonds having different polymerization ability, whereby a polymer having a cyclic structure in the main chain, will be obtained.

A monomer of a perfluoro vinyl ether type is preferably employed as a monomer which readily undergoes cyclopolymerization. The one with a molecular length being too long or too short, is not preferred since the cyclopolymerization ability will be thereby poor. Preferred is a monomer having from 2 to 4 atoms which connect the carbon-carbon double bonds (the chain of atoms connecting the carbon-carbon double bonds may have a cyclic structure or a branched structure, but the number of atoms indicated here is the number of atoms connecting the carbon-carbon double bonds in the minimum distance).

Among them, a perfluoro vinyl ether type compound of the formula $CF_2=CFO(CF_2)_nCF=CF_2$ (wherein n is 1 or 2) is most preferred from the viewpoint of the cyclopolymerization ability and the polymerization ability with PDD.

A monofunctional perfluoro vinyl ether monomer such as perfluoropropyl vinyl ether, or a monomer such as hexafluoropropylene, can hardly be copolymerized with other monomer such as tetrafluoroethylene. It is impossible to obtain a copolymer comprising more than 20% of these monomers under mild conditions. These monomers also have a difficulty in the copolymerization with PDD. Whereas, the above-mentioned perfluoro vinyl ether and PDD can be copolymerized at any optional ratio, and it is possible to obtain a copolymer having an optional composition in good yield by properly adjusting the composition of the feed. Further, the above-mentioned perfluoro vinyl ether can be copolymerized with PDD while undergoing cyclopolymerization at any compositional ratio, whereby it is possible to obtain a non-crystalline transparent polymer, which is soluble in a solvent, since no unreacted double bond which is likely to form a cross linking structure, will remain in the polymer.

In the present invention, copolymerization is preferably conducted in such a range that the content of the perfluoro monomer is from 1 to 99% by weight, and the content of PDD is from 1 to 99% by weight. The larger the content of PDD, the higher Tg of the perfluoro vinyl ether/PDD copolymer. By adjusting the composition for copolymerization, polymers having a wide range of Tg ranging from 70° C. to 300° C. can be obtained. However, if the PDD content exceeds 95% by weight, the solubility to the solvent tends to be poor to some extent, such being not practical.

The copolymer of the present invention is not only transparent but has a low refractive index. It is possible to obtain a polymer having a refractive index within a range of from 1.29 to 1.34 by properly adjusting the composition for copolymerization.

In the above polymerization, it is possible to feed the monomers to the polymerization system during the polymerization. This method of subsequent feeding has merits that the molecular weight distribution can be made narrower, and the monomer composition of the polymer can be made uniform.

The above perfluoro copolymer may be combined with other copolymer component to such an extent not to impair the essential properties of these components, to obtain a three-component or multi-component copolymer. If required, the polymer may be crosslinked by a certain method.

As other monomers for the multi-component copolymerization, a wide range of monomers including fluorine-containing type and hydrocarbon type may be mentioned without any particular restriction so long as they are monomers having radical polymerization ability. Needless to say, such other monomers may be used alone for the radical copolymerization with the above-mentioned specific perfluoro vinyl ether monomer and perfluorodioxol, or they may be used in combination of two or more of them for the copolymerization reaction.

In the present invention, it is usually preferred to select as such other monomer a fluorine-containing monomer such as a fluoro olefin or a fluoro vinyl ether. For example, tetrafluoroethylene, perfluoromethyl vinyl ether, perfluoropropyl vinyl ether or a perfluorovinyl ether containing a functional group such as a carboxylic acid group or a sulfonic acid group is a preferred example, and vinylidene fluoride, vinyl fluoride or chlorotrifluoroethylene may also be mentioned. The content of such other monomers is to such an extent not to impair the essential properties of the perfluoro copolymer, and it is usually at most 50% by weight, more preferably at most 20% by weight.

In the present invention, as a method for crosslinking the perfluoro polymer, a conventional method which is commonly employed, may optionally be employed. For example, a monomer having a crosslinking site may be copolymerized for crosslinking, a crosslinking agent may be incorporated for crosslinking, or crosslinking can be conducted by means of radiation or the like.

In the present invention, the specific perfluoro monomer and PDD can be copolymerized at any optional ratio, and the compositional ratio of these monomers in the copolymer can freely be controlled. Therefore, perfluoro copolymers having various desired physical properties can be obtained. Further, perfluoro copolymers obtained by the present invention have substantially no crystallizability over the entire compositional range, and they show high transparency and high light transmittance in spite of the fact that they are fluorine resins. Further, if they are perfluoro polymers, they are believed to have lower refractive indices than ordinary hydrocarbon type resins, and they are excellent in the moisture resistance, weather resistance and chemical resistance. However, such an explanation is intended to help understand the present invention and by no means restricts the present invention.

Now, the present invention will be described in further detail with reference to Examples. However, it should be understood that the present invention is by no means restricted by such specific Examples.

EXAMPLE 1

10 g of perfluorobutenyl vinyl ether, 0.5 g of PDD, 10 g of trichlorotrifluoroethane and 0.02 g of diisopropylperoxy dicarbonate as a polymerization initiator were put into a pressure resistant glass ampule having internal capacity of 50 ml. The interior was freeze-deaerated three times, and the ampule was shaken in a water bath at 40° C. for 22 hours. As a result, 7.1 g of a polymer was obtained.

This polymer was dissolved in perfluorobenzene, and the $^{19}$F-NMR spectrum was measured, whereby in addition to an absorption spectrum attributable to a polymer unit perfluorobutenyl vinyl ether, an absorption by a $CF_3$ group attributable to PDD was ascertained. Further, the IR spectrum was measured, whereby no absorption by a double bond attributable to perfuorobutenyl vinyl ether was observed, and the polymer was soluble in a solvent. This indicates that the perfluorobutenyl vinyl ether was copolymerized with PDD while undergoing cyclopolymerization.

This polymer was dissolved in perfluoro (2-butyltetrahydrofuran) to obtain a 10% solution. This solution was cast on a glass sheet and then left to stand at 30° C. for 5 hours and 50° C. for 20 hours. Further, it was vacuum-dried at 100° C. to obtain a film. The refractive index of the film was measured by means of Abbe refractomerter and was found to be 1.33. This film was put into water, whereby the interface between the film and water could not be identified by visual observation. Further, the light transmittance of this film was measured and found to be 95% at a wavelength of from 250 to 700 nm.

EXAMPLE 2

8 g of perfluorobutenyl vinyl ether, 2 g of PDD, 10 g of perfluoro (2-butyltetrahydrofuran) and 0.02 g of diisopropylperoxy dicarbonate as a polymerization initiator were put into a pressure resistant glass ampule having an internal capacity of 50 ml. The interior was freeze-deaerated three times, and then the ampule was shaken in a water bath at 40° C. for 20 hours. As a result, 6.7 g of a polymer was obtained. The glass transition temperature of this polymer was 157° C., and the intrinsic viscosity ($\eta$) was 0.35 dl/g as measured at 30° C. in perfluoro (2-butyltetrahydrofuran), and it was a tough, transparent glass-like polymer. The content of PDD was determined from the absorbance of the absorption at 1,930 $cm^1$ in the IR spectrum and found to be 12%. Further, the refractive index was measured by means of Abbe refractometer and found to be 1.32.

EXAMPLE 3

5 g of perfluorobutenyl vinyl ether, 5 g of PDD and 0.02 g of diisopropylperoxy dicarbonate as a polymerization initiator were put into a pressure resistant glass ampule having an internal capacity of 50 ml. The interior was freeze-deaerated three times, and then the ampule was shaken in a water bath at 40° C. for 1 hour. As a result, 3.8 g of a polymer was obtained. The glass transition temperature of this polymer was 213° C., and the intrinsic viscosity ($\eta$) was 0.99 dl/g as measured at 30° C. in perfluoro (2-butyltetrahydrofuran), and it was a tough, transparent glass-like polymer. The content of PDD was determined from the absorbance of the absorption at 1,930 $cm^1$ in the IR spectrum and found to be 71%. Further, the refractive index was measured by means of Abbe refractometer and found to be 1.30.

EXAMPLE 4

2 g of perfluoroallyl vinyl ether, 8 g of PDD, 10 g of trichlorotrifluoroethane and 0.02 g of diisopropylperoxy dicarbonate as a polymerization initiator were put into a pressure resistant glass ampule having an internal capacity of 50 ml. The interior was freeze-deaerated three times, and then the ampule was shaken in a water bath at 30° C. for 20 hours. As a result, 7 g of a polymer was obtained. The glass transition temperature of this polymer was 210° C., and the intrinsic viscosity ($\eta$) was 1.15 dl/g as measured at 30° C. in perfluoro (2-butyltetrahydrofuran). The content of PDD was determined from the absorbance of the absorption at 1,930 $cm^1$ in the IR spectrum and found to be 82%. The refractive index was measured by means of Abbe refractometer and found to be 1.29.

COMPARATIVE EXAMPLE 4 g of PDD, 65 g of trichlorotrifluoroethane and 0.05 g of diisopropylperoxy dicarbonate were put into a stainless steel ampule having an internal capacity of 100 ml. The interior was freeze-deaerated three times, and then 10 g of tetrafluoroethylene was introduced. The ampule was shaken in a water bath at 55°0 C. for 5 hours, whereby 10.5 g of a polymer was obtained. From the analysis of fluorine content, the content of PDD was about 10%. This polymer was press-molded at 340° C. to obtain a film. The film was translucent and had white speck-like opaque portions. Further, this polymer had portions soluble in perfluoro (2-butyltetrahydrofuran) and portions hardly soluble in perfluoro (2-butyltetrahydrofuran).

EXAMPLE 5

5 g of perfluorobutenyl vinyl ether, 25 g of PDD, 120 g of deionized water, 20 g of methanol and 0.15 g diisopropylperoxy dicarbonate were put into a glass autoclave having internal capacity of 200 ml. The interior was pressured to a 1 $kg/cm^2G$ with $N_2$. The evacuation followed by $N_2$ addition was repeated three times. The autoclave was stirred and heated to 30° C. for 20 hours. As a result, 24.9 g of polymer was obtained.

Glass transition temperature of this polymer was 248° C. and intrinsic viscosity was 1.0 g/dl. The content of PDD was determined from the absorbance at 1,930 $cm^1$ in the IR spectrum and found to be 85%. Further, the dielectric constant was 2.0 and the refractive index was 1.29 by means of Abbe refractometer.

EXAMPLE 6

2 g of polymer obtained in Example 5 is dissolved in 198 g of perfluoro (2-butyltetrahydrofuran) and a 1% solution is obtained. Transparent sheets made of glass, polycarbonate, polystyrene and polymethacrylate are dip coated with the solution and cured in oven. The coating thickness was 106 nm. The light reflection at 550 nm for each sheet is reduced from 8.6% to 0.3%, from 10.2% to 0.2%, from 10.4% to 0.15% and from 7.8% to 0.6%. These sheets can be used if produced in bigger scale as cover for television screen, cover for pictures, showcases. A piece of screen for projection television is dip coated with the solution. The reflection of light is reduced and therefore the contrast of the screen is excellent.

EXAMPLE 7

A sheet of glass is dip coated with the solution as in Example 6 with the difference that the glass sheet was pretreated with silane coupling agent (3-aminopropyltrimethoxysilane). The light reflection is reduced to 0.3% and the coating is scratch resistant.

EXAMPLE 8

A 5' silicon wafer with aluminum test patterns was pretreated with silane coupling agent and a 4% solution (solvent 1,1,1,2,2,3,3,4,4,5,5,6,6,7,7,8,8 heptadecafluorodecane) of the polymer obtained in Example 3 was spincoated and cured in an oven at 50° C. for 1 hour and 200° C. for 1 hour. The dry film thickness is 2 μm. The coated wafer is tested at 125° C. 100% humidity (pressure cooker test) for 300 hours and no corrosion of aluminum patterns is obtained. It is proved that this coating is excellent for passivation layer for integrated circuits.

EXAMPLE 9

The coated wafer obtained in Example 8 is coated with resist, exposed and developed. Aluminum is sputtered and a test pattern is made on the polymer coating by lift-off method. Another coating of the polymer solution as in Example 8 is coated and cured in oven on the new test pattern. Via holes to the test patterns are opened by photolithography and RIE dry etching using $CF_4+CHF_3+Ar$ as etching gas. It is proved that this polymer is an excellent low dielectric constant interlayer for integrated circuits and multi-chip modules.

According to the present invention, a perfluoro vinyl ether having cyclic polymerization ability and perfluorodioxol can be copolymerized at any optional ratio, and the compositional ratio of these monomers in the copolymer can freely be controlled, whereby perfluoro copolymers having various desired physical properties can be obtained. Further, with the perfluoro polymer obtained by the present invention, the glass transition temperature can be controlled while maintaining the non-crystallizability by optionally selecting the composition for copolymerization, and the perfluoro polymer has a high glass transition temperature, and it is excellent in the solvent solubility and transparency and also has high heat resistance. Further, the refractive index is low, and it is possible to obtain a polymer having an optional refractive index by properly adjusting the composition for copolymerization.

The perfluoro polymer according to the present invention has excellent properties as a perfluoro polymer, such as heat resistance and chemical stability and yet is a non-crystallizable, transparent, solvent-soluble polymer. By virtue of these properties, it is possible to form a super thin film free from defects such as pin holes, and it is expected to be applied also as a coating material or a separation membrane material. By virtue of the low refractive index, it may also be applied to the field of optical materials such as a reflection-preventing agent or a cladding material for optical fibers. Further, as a fluorinated compound, the fluorine-containing polymer of the present invention has a low dielectric constant and thus is applicable as an electronic material.

Further, applications of the perfluoro polymer of the present invention include, for example, a wire-coating material, a protective layer for a magnetic recording medium, a material for gas selective permeation membrane, an optical lens, a photo conductor, an artificial rock crystal, a low reflecting agent, a laminating material for a safety glass, an adhesive for optical elements, a light-receiving material for a solar cell, a protective film for color filters, a flux-creeping preventive agent, a releasing agent, a protective layer for semiconductors, passivation layer for integrated circuits, low dielectric constant interlayer for integrated circuits and multichip modules, a window material for aircrafts, a coating material for a mirror surface, a basic material for mirrors, a fishing line, a semiconductor carrier, a protective film material for pelicle, a surface layer for an electron photographic photosensitive material, a nonlinear optical element, a base material for a photochromic shaped product, a filter material, a support for electrophoresis, a photoreactor, a bioreactor and an ultraviolet lamp.

What is claimed is:

1. A perfluoro copolymer comprising the radical polymerization product of:

1–99% by weight of $CF_2=CFOCF_2CF=CF_2$; and

1–99% by weight of perfluoro-2-2-dimethyl-1,3-dioxol.

2. The perfluoro copolymer of claim 1, wherein said perfluoro copolymer has a Tg of from 70°–300° C.

3. The perfluoro copolymer of claim 1, wherein said perfluoro copolymer has a refractive index ranging from 1.29– 1.34.

4. The perfluoro copolymer of claim 1, wherein said perfluoro copolymer has substantially no crystallizability.

5. The perfluoro copolymer of claim 1, further comprising other radically polymerizable monomers.

* * * * *